Oct. 11, 1927.
L. E. SLAUSON
1,644,858
TRACTION WHEEL
Filed Jan. 14, 1924
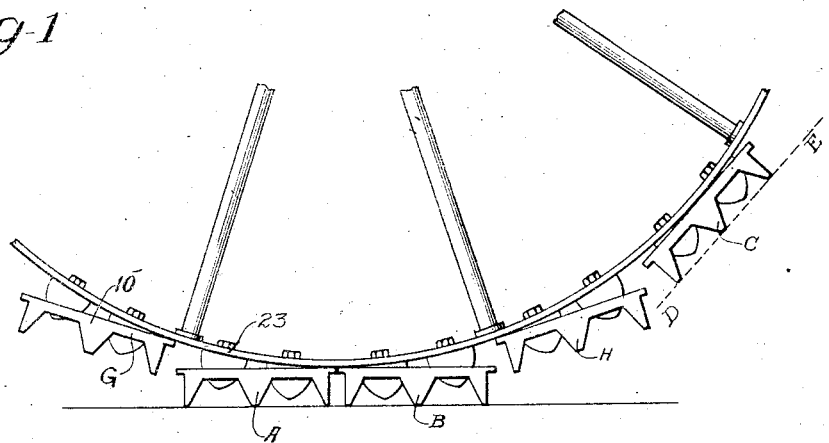
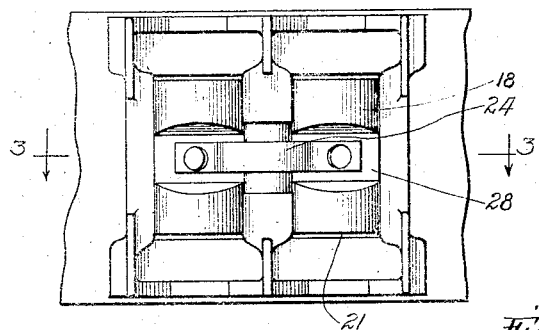
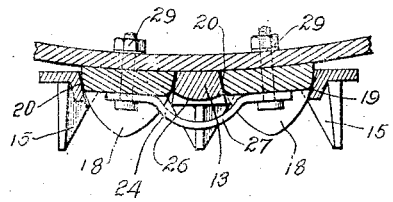
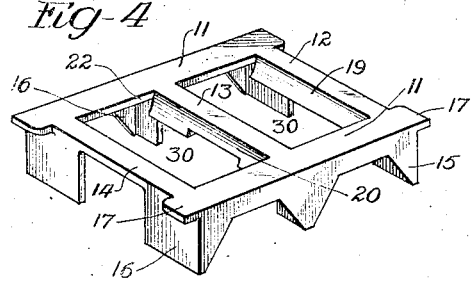
Inventor:-
Louis E. Slauson
By:- Wm O Bell  Atty:-

Patented Oct. 11, 1927.

1,644,858

UNITED STATES PATENT OFFICE.

LOUIS E. SLAUSON, OF ROCK ISLAND, ILLINOIS.

TRACTION WHEEL.

Application filed January 14, 1924. Serial No. 686,048.

The principal object of this invention is to provide a wheel rim with a plurality of tractor shoes so mounted that they will automatically lay a track for the wheel to travel on whether it moves forward or backward in a straight line, or on a curve.

Another object of the invention is to provide the rim and the shoes with interengaging elements that co-operate like the teeth of a gear and a rack to provide an efficient driving connection between the rim and the shoes whereby slippage of the rim is practically eliminated.

Another object of the invention is to reduce the wear on the wheel rim and provide a construction in which worn parts can be easily and quickly replaced with new ones.

Another object of the invention is to provide a construction that can be applied to old traction wheels or embodied in new traction wheels.

Further objects of the invention will become apparent as the description is read in connection with the accompanying drawing showing a selected embodiment of the invention, and in which Fig. 1 is a fragmentary view showing a plurality of shoes applied to a section of a rim;

Fig. 2 is an inverted plan view of a traction shoe and a fragment of a rim;

Fig. 3 is a longitudinal section on the line 3—3 of Fig. 2; and

Fig. 4 is a perspective view of one of the traction shoes.

The embodiment of the invention here disclosed is particularly adapted for application to traction wheels in which the periphery of the rim is a section of a cylinder. The traction shoes 10 are of skeleton form and are each composed of two parallel track elements 11 connected by three transverse bars 12, 13 and 14. In order to provide a proper grip between the shoes and the ground, the shoes are each provided with transverse ground engaging bars 15, which may be cut away at the central portion thereof, if desired, or which may be made to extend entirely across the shoes co-incident with the transverse members if more area of gripping surface is needed.

Suitable braces 16 are provided to give the necessary strength and permit a light construction. The track elements 11 extend slightly beyond the transverse bars 12 and 14 as indicated at 17 and serve to space the bars 15 on the adjacent ends of two shoes as illustrated in Fig. 1. The upper surface of the track shoes is substantially plain and flat to afford proper support for the rim of the traction wheel.

The rim is provided with a series of pairs of teeth 18 which converge outwardly as indicated in Figs. 1 and 3 and co-operate with the gear tooth surfaces 19 and 20 on the transverse bars 12, 13 and 14, as is also illustrated in Figs. 1 and 3. The side edges 21 of the teeth co-operate with the inner edges 22 of the track elements to keep the shoes substantially aligned with the rim of the wheel. There is, however, sufficient clearance left between these surfaces to permit a free adjustment of the shoes. In order to secure the shoes in the proper relationship to the rim 23 and the teeth 18, I prefer to secure a strap 24 to the intermediate portion of each tooth and have it extend across the outer face of the intermediate transverse bar 13 which is rounded at 26 to conform to the curved portion 27 of the strap, whereby the strap loosely engages the bar 13. As illustrated, the teeth 18 are cut away at the middle to form seats 28 for the ends of the strap, and the same bolts 29 which secure the teeth to the rim also secure the straps thereto. By the use of pairs of teeth arranged to co-operate with the shoes as shown, a single bolt is sufficient to secure each tooth to the rim and these bolts are made to fasten the strap 24 also.

In Fig. 1 I have shown at the lower side, two shoes A and B in the positions they will assume when the wheel is just moving from one to the other, or in other words, when the two shoes are jointly supporting the wheel. At the right in Fig. 1 I have shown a shoe C in the position it will assume when the broken line D, E is the ground and the load of the wheel is approximately in the middle of the single shoe C. This figure also shows a shoe G in the position it assumes as it rises from the ground with the rear portion of the wheel and another shoe H in the position it assumes in approaching the ground on the front side of the wheel. These illustrations will make it clear that the shoes have a pivotal and bodily movement relative to the rim, as they approach and leave the ground so that the bars 15 enter the ground and are withdrawn therefrom along straight lines substantially perpendicular to the surface over which the wheel is traveling. This results in a minimum disturbance of the surface of the ground and presents the side faces of the bars in the best position to prevent slippage. When the traction wheel is moving over average ground, the bars 15 will sink well below the surface and prevent any slippage between the shoes and the ground, while the surfaces of the teeth 18 co-operate with the faces 19 and 20 of the transverse bars 12 and 13 and 14 to prevent any appreciable slippage between the rim and the shoes.

The openings 30 in the traction shoes are just sufficiently larger than the teeth 18 to permit the flexibility necessary to allow the shoes to accommodate themselves to the contour of the ground over which the wheel has to travel. The space between the curved portion 27 of the strap 18, and the outer surface of the rim 23 is considerably greater than the intermediate cross member 13 as is best shown in Fig. 3, and this loose connection permits the shoes to take the different positions indicated in Fig. 1 whereby they are laid down in front of the wheel and taken up behind the wheel and form a substantially continuous track to which the wheel is geared by the co-operating of the teeth 18 with the transverse bars 12, 13 and 14.

With this construction, slippage between the wheel and the traction shoes is so slight that it cannot be detected with the eye, and the slippage between the shoes and the ground under average conditions is practically nil. By connecting the shoes to the wheel through the straps 24 and the intermediate bars 13, there is practically no wear on the rim due to the movement of the shoes, and when the shoes, the teeth or the straps become worn, they can be readily replaced with new stock.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:—

1. The combination of a rim, gear teeth on said rim, a series of shoes each including transeverse members which together form a rack for engagement with said teeth, and a strap for each shoe secured to the rim and loosely engaged with one of said transverse members to retain the shoes in co-operative relation with the corresponding teeth.

2. The combination of a rim, a plurality of teeth secured to the rim, a traction shoe having openings to receive said teeth, and a strap secured to the rim and loosely engaged with said shoe to maintain the shoe in co-operative relation with the teeth.

3. The combination of a rim, a pair of circumferentially aligned teeth secured thereto, a traction shoe having openings to receive said teeth, and a strap extending between said teeth and loosely securing said shoe to the rim.

4. The combinaion of a rim, a pair of teeth secured to the rim and spaced apart circumferentially, a traction shoe having openings to receive said teeth, and a strap extending between said teeth across a portion of said shoe between said openings to loosely secure said shoe to the rim.

5. The combination of a rim, a pair of teeth spaced apart and converging outwardly from the rim, a traction shoe comprising longitudinal track members, and a plurality of transverse members spaced apart by openings extending through the shoe and adapted to receive said teeth, and a strap extending between said teeth across a transverse member to secure said shoe to the rim.

6. The combination of a rim, a pair of teeth secured to the rim and converging outwardly, a traction shoe comprising a plurality of track sections connected by transverse bars having faces to co-operate with said teeth, and a strap extending between said teeth and about an intermediate transverse bar to loosely connect said shoe to said rim.

7. The combination of a rim, a pair of teeth secured thereto and circumferentially spaced apart, the working faces of said teeth being curved and converging outwardly from said rim, a traction shoe comprising a pair of longitudinal track elements connected by a plurality of transverse bars, and a curved strap secured to said teeth and loosely engaging one of said transverse bars to connect the shoe with the rim.

8. The combination of a rim, a pair of teeth spaced apart circumferentially, a traction shoe including a plurality of transverse bars for co-operating with said teeth, seats on said teeth, and a curved strap extending between said seats and loosely engaging one of said transverse bars to secure said shoe to said rim.

9. The combination of a rim, a series of teeth secured to the periphery of said rim, a series of traction shoes having openings to receive said teeth, and a strap for each shoe secured to said rim and loosely engaging said shoe to hold it in co-operative relation with adjacent teeth on the rim.

10. The combination of a rim, a traction shoe comprising a plurality of longitudinal track sections connected by transverse bars, a strap secured to said rim and loosely engaging one of said bars to hold said shoe in co-operative relation to said rim.

11. The combination of a rim, a traction shoe having longitudinally extending track sections, transverse ground engaging bars at the ends of said shoe, an intermediate transverse member on the shoe, and a strap secured to the rim and over-lying the said intermediate member for loosely holding said shoe on said rim so that it can move pivotally and bodily relative to the rim.

12. The combination of a rim, a traction shoe comprising a substantially central transverse member rigid therewith, and a single strap secured to said rim and loosely engaging said member and securing the shoe to the rim so that the shoe may move bodily relative to the rim.

13. The combination of a rim, a traction shoe comprising a substantially central transverse member rigid therewith, and a single strap secured at its ends to the outer face of the rim and crossing said member midway between its ends for securing the shoe to the rim so that the shoe may move bodily relative to the rim.

LOUIS E. SLAUSON.